Patented Feb. 16, 1932

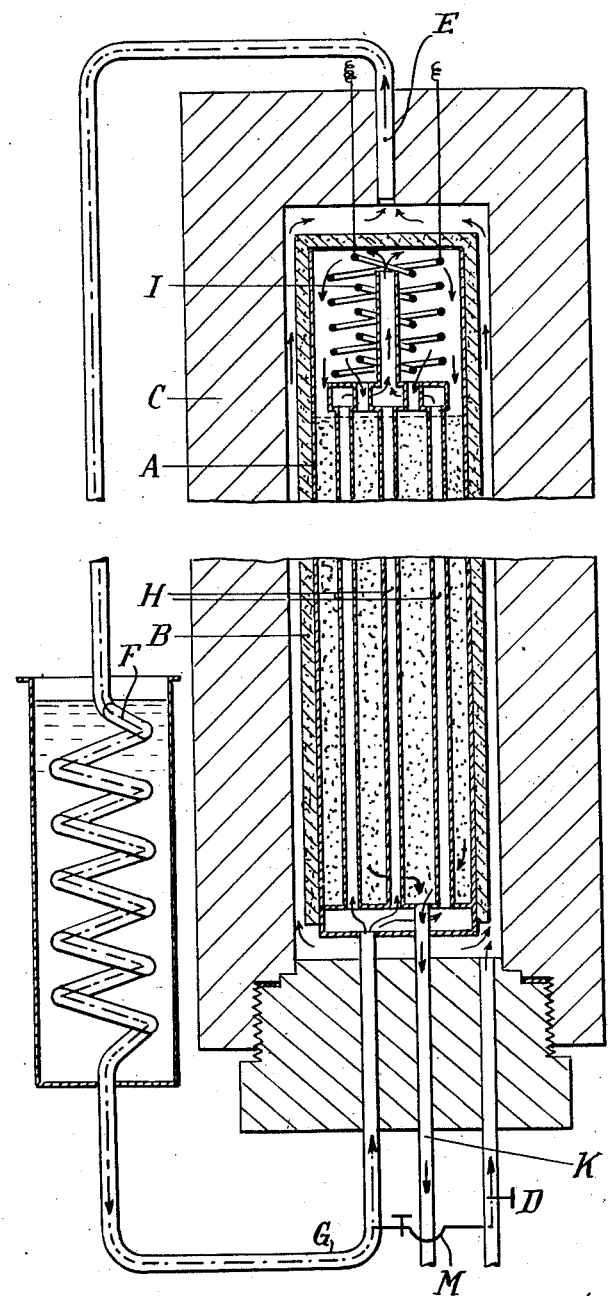

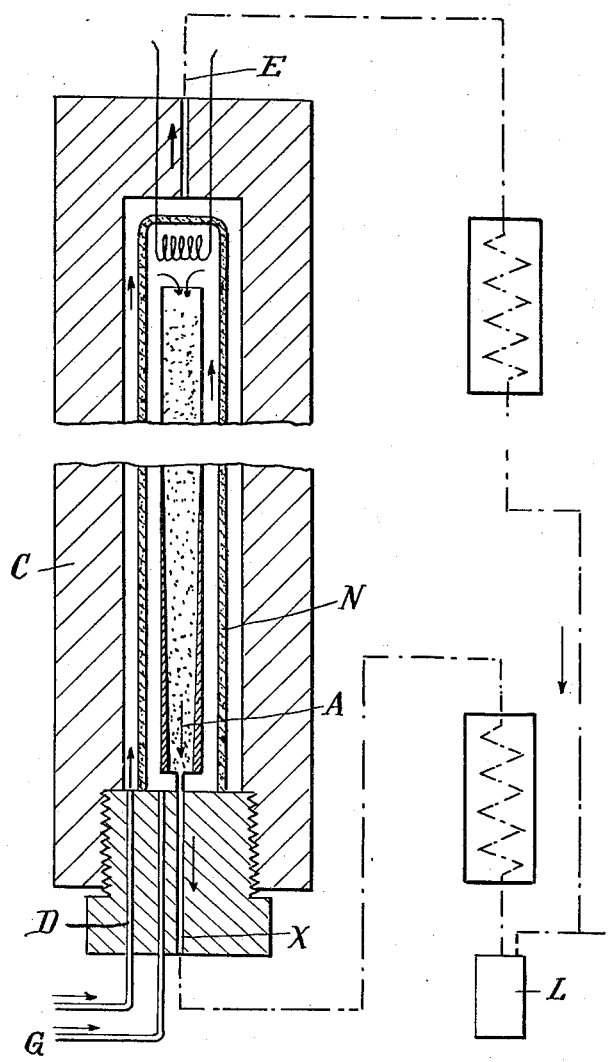

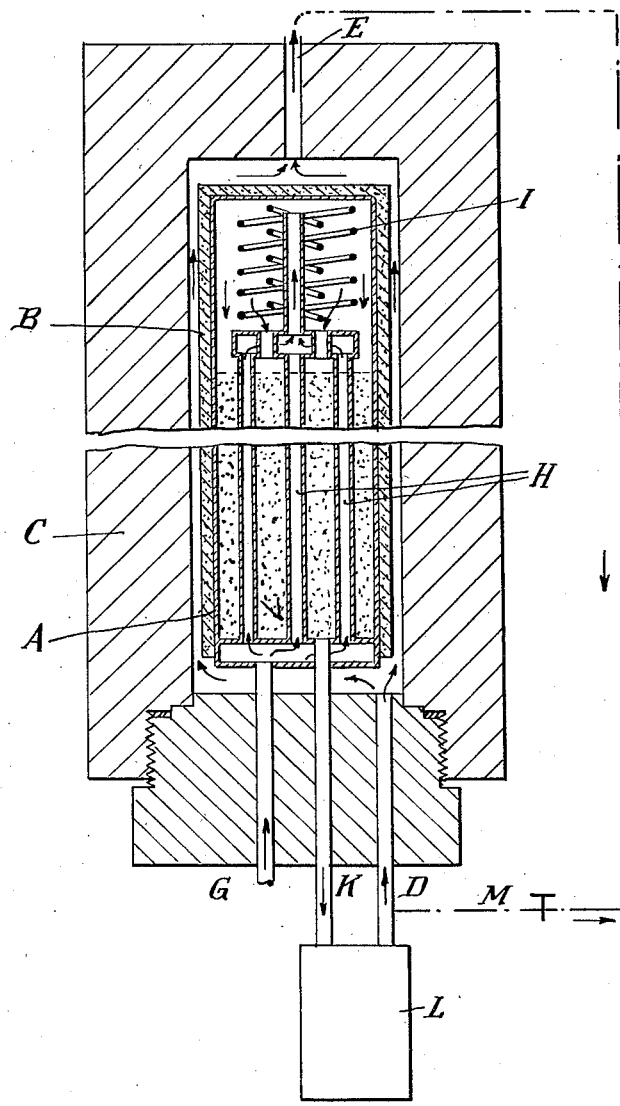

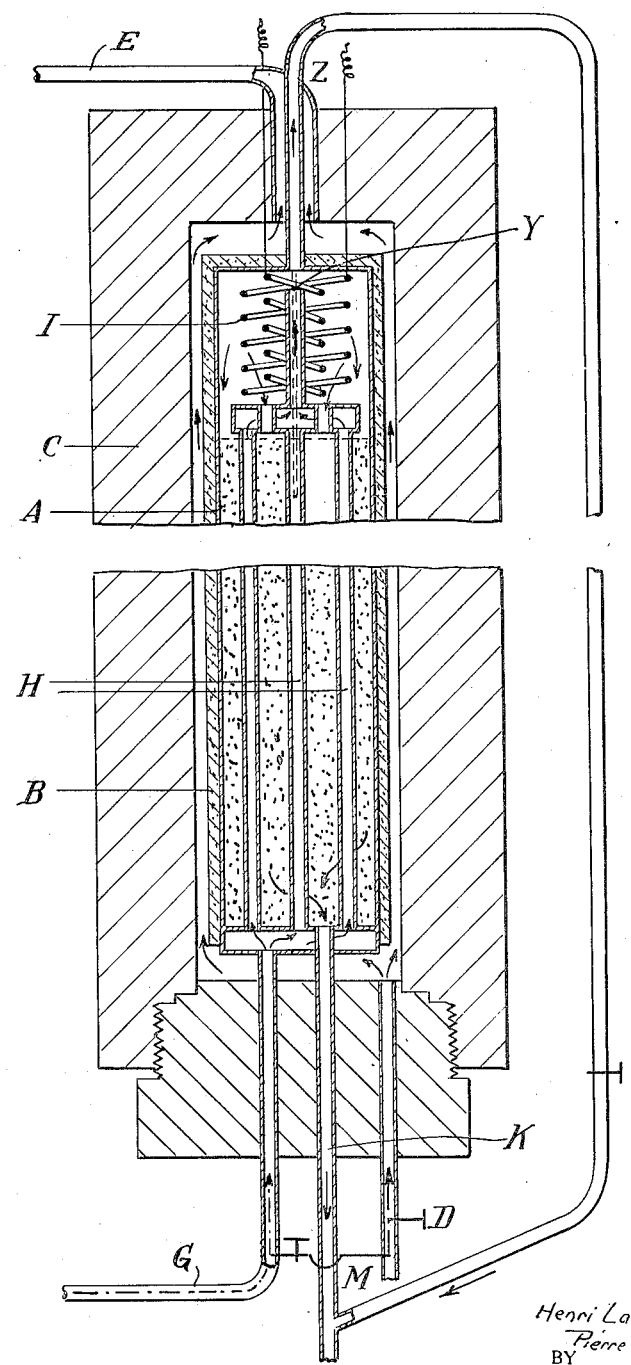

1,845,050

UNITED STATES PATENT OFFICE

HENRI LANTZ AND PIERRE SCHIDELER, OF PARIS, FRANCE, ASSIGNORS TO E. I. DU PONT DE NEMOURS & COMPANY, OF WILMINGTON, DELAWARE, A CORPORATION OF DELAWARE

METHOD OF AND APPARATUS FOR CONDUCTING EXOTHERMIC GASEOUS REACTIONS UNDER PRESSURE

Application filed March 29, 1927, Serial No. 179,225, and in France March 31, 1926.

This invention relates to a method of and apparatus for conducting catalytic exothermic gaseous reactions under pressure.

In reactions of the type mentioned two important and essential requirements must be met. The more highly exothermic the reaction the more necessary it is that heat be removed from the apparatus; otherwise, the temperature of the catalyst will rapidly rise to values at which its physical form or activity may be unfavorably affected, the reaction equilibrium may be changed in such a way as to result in a lower conversion of the reacting gases, and/or undesirable side reactions may be accelerated. Also, the pressure-sustaining wall of the reaction apparatus must be protected from excessive temperature, particularly when the gases in contact therewith contain constituents likely to attack the metal of the wall at such temperatures, as for example in the synthesis of ammonia from nitrogen and hydrogen.

It is known that this protection of the pressure-sustaining wall can be secured by circulating part or all of the gases to react between the catalyst container and the pressure-sustaining wall. This method is indicated, for example, in U. S. Patent No. 1,544,373. In this and other prior patents reference is also made to various methods for removing the heat developed by the reaction, among these being the utilization of the heat capacity of the gases that are to react.

If, however, the reaction in question is an extremely exothermic one or if the catalyst employed is of unusually high activity, the intensity of the heat evolution may be of such an order as to render the foregoing methods of heat removal and wall protection inadequate.

It is the object of the present invention to provide, especially for such conditions of operation, an improved method of removing the heat of the reaction while simultaneously assuring proper protection of the pressure-sustaining wall.

Other objects and advantages of the invention will be apparent as it is better understood by reference to the following specification in which its preferred embodiments are described.

The method consists in causing a part or practically all of the heat of the reaction to be absorbed by the gases that are to react immediately before their combination, while by circulating between the catalyst container and the pressure-sustaining wall a suitable gas, for instance a part or all of the gases to react, cooling said gases as may be necessary, and utilizing them under the same conditions as before or otherwise employing them for cooling the catalyst before passing them into direct contact therewith.

While the invention is capable of embodiment in many different forms, for the purpose of illustration only three types of apparatus are shown in the accompanying drawings, in which—

Figures 1, 2, 3 and 4 are diagrammatic representations of three forms of apparatus adapted for the practice of the invention.

Referring to Figure 1, the tube or cartridge containing the catalyzing material is constituted essentially of a cylindrical receptacle the wall of which is preferably a poor thermal conductor and to this end is, for example, made of ordinary metal covered with a heat insulating material B. The pressure-sustaining tube is designated as C. The cartridge A is entirely closed except for the opening for the admission of the gases which are to react, the outlet for the gases which have reacted, and possible openings for connecting an electric heating coil I disposed within the cartridge A.

Between the outer wall of A and the inner wall of C there circulates the gaseous mixture which is to react, arriving through D and leaving through E. In this circulation, the gaseous mixture is heated (and correspondingly cools the catalyst and the gases in contact therewith) to an extent depending upon the surface, the thickness and the conductivity of the wall B, and also upon the rate of gas flow. The portion of the heat of reaction which passes through the wall A is in any case less than that which would prevent the gas from playing the part of a screen protecting the wall C, that is to say, than that which would cause the wall of C to suffer serious loss of mechanical strength. It should be observed that the said heating may be very slight and may, in some instances, be reduced to the inevitable losses thru the imperfect insulation of the wall A. Since the process includes the utilization of the gaseous mixture for further cooling of the catalyst and since after traversing the space between C and A the said mixture is likely to be too warm to effectively accomplish this result, provision is made at F for cooling it prior to passing it again in heat exchange relation to the catalyst. Thus, the gaseous mixture leaving through E traverses the cooling coil F and then enters the cartridge A through G. Thence it passes through a bundle of tubes H, wherein it absorbs further portions of the heat of reaction. Then, thus heated, with additional heating by the electrical heating coil I, when necessary, the gaseous mixture passes over the catalyzing material, and reacts in contact therewith. The gases are withdrawn through K to the apparatus where the product of the reaction is collected.

As indicated in U. S. Patent No. 1,605,667, the thermal conductivity of the cartridge wall A need not be the same throughout its length; for example, the heat-insulating material B may be thicker at the end of A near the entrance tube G than at the other end. Likewise the inner bundle of tubes H may have a thermal conductivity which varies with the location and/or have a larger surface in the hottest zone of the cartridge.

On the other hand, the circulation of the gas in the space between A and C might take place in a direction opposite to that shown in the illustration.

A by-pass M, provided with a control valve, makes it possible to regulate the quantity of gas circulating around the heat-insulated cartridge.

If necessary the cartridge A might contain a heat exchanger, in one part of which, connected with the entrance conduit G, circulate the gases before reacting and in the other part of which circulate the gaseous products of the reaction before leaving the apparatus through M.

In Figure 2, the inner tube containing the catalyzing material A is covered by a jacket N which may be of a material of poor heat conductivity. The gases to protect the wall C enter at D, circulate between N and the outer tube C and leave at E. Another part of the gases which are to react arrive through G, circulate inside N and around A, are heated, if necessary, by the heating coil, and then pass over the catalyzing material, reacting as they do so. The gases leave by way of X. After a suitable cooling and separation of the compounds formed at L this portion of the gases can be reunited with the protecting gases which are cooled, if necessary, after passing out through E. The two gaseous portions thus united can be passed to another reaction tube or returned to the tube A by a compressor.

If the two gaseous portions which are admitted at D and G are at the same pressure and the same temperature, they may be admitted through one single tube and be divided afterwards in the apparatus by means of orifices in the lower part of the jacket N.

In the arrangement shown in Figure 3 the gases which are to react are admitted through the conduit G directly into the chamber A where they circulate in the interior of the group of tubes H; they then pass in the reverse direction round the exterior of this group of tubes and in contact with the catalyzing material where they combine, afterwards leaving the chamber A through the conduit K, the product of the combination being separated either wholly or partially in the separator L after recovery if desired of the heat of the gases. The residual gases from this separation which are already cooled or which are then cooled if necessary return through the conduit D into the space between the outer wall of the chamber A and the inner wall of the pressure-resisting tube C, leaving the said space through the conduit E and being afterwards cooled to a suitable extent before being returned to the following catalyzing tube.

A by-pass M permits of regulating the circulation of the gases round the chamber A.

In carrying out the process as hereinbefore described it may happen in some cases that it is impossible in practice to satisfactorily effect the removal of the part of the heat evolved by the reaction which ought to be removed by the gas circulating between the pressure-sustaining wall and the catalyst container. This may be the case, for example, when with a chemical reaction evolving a very large amount of heat, one would be led to circulate between the exterior tube and the catalyst container a quantity of gas practically too large.

In order to avoid these difficulties, according to the modification of the process illustrated in Figure 4, there is circulated within the reaction apparatus a quantity of gas greater than that which is to react in contact with the catalyst and the excess of this gas is removed from the apparatus before it comes in contact with the catalyst. In this way it is possible to remove from the apparatus supplementary quantities of heat.

Figure 4 represents diagrammatically by way of example an arrangement for carrying out the process thus modified.

The arrangement represented is analogous to that of Figure 1, but the catalyst container A, at the end opposite to that of the arrival of the gases, is provided with a conduit Z, for withdrawal of the gas which has circulated about the vessel A; this conduit Z may conveniently be disposed within the conduit E and may be of a special metal resistant to pressure and temperature, and may, if necessary, be provided with thermal insulation.

The circulation of the gases about the catalyst container A takes place as in the process as hereinbefore described, these gases circulating between the said container and the wall C of the pressure-sustaining tube, which is protected, if necessary, by an interior lining of a substance not attacked by the gases, which may be metallic or heat insulating, or both.

The gases arriving thru G circulate within the tubes H, wherein they are heated by absorption of a part of the heat evolved by the reaction. Then, arriving at the end of the tube Y a portion of the heated gases is removed thru the conduit Z, while the remainder, returning in the opposite direction, circulates in direct contact with the catalyzing material and there reacts.

The conduit Z may be extended to the interior of Y or even to the interior of one of the tubes H in order to remove the gases at any temperaure that may be desired.

The gases leaving by way of Z may be cooled, if desired, and then, as represented in the figure, be mixed with the gases leaving at M. The mixture, after removal of the products of the reaction in the course of which it may undergo cooling, may be submitted to further reaction. A valve R makes it possible to regulate the flow of the gases passing out thru Z and consequently to vary the quantity of heat thus removed.

The method and apparatus described are susceptible of application to the synthesis of ammonia, the production of oxygenated hydrocarbons from carbon monoxide and hydrogen, and to other catalytic exothermic reactions that may advantageously be carried out under pressure.

Various changes may be made in the method hereinbefore described without departing from the invention or sacrificing any of the advantages thereof.

We claim:

1. The method of effecting catalytic exothermic gaseous reactions under pressure, which comprises passing gases going to the reaction between the pressure sustaining wall of the reaction apparatus and the catalyst, cooling said gases, passing them within and in heat exchange relation to but not in direct contact with the catalyst, and thereafter into direct contact with the catalyst.

2. The method of effecting catalytic exothermic gaseous reactions under pressure, which comprises passing gases going to the reaction between the pressure-sustaining wall of the reaction apparatus and the catalyst, cooling said gases, adding thereto a portion of fresh gases, passing the mixture in heat-exchange relation to but not in direct contact with the catalyst, and thereafter into direct contact with the catalyst.

3. The method of effecting catalytic exothermic gaseous reactions under pressure which comprises passing gases going to the reaction between the pressure-sustaining wall of the reaction apparatus and the catalyst, cooling said gases and thereafter passing them into direct contact with the catalyst.

In testimony whereof we affix our signatures.

HENRI LANTZ.
PIERRE SCHIDELER.

CERTIFICATE OF CORRECTION.

Patent No. 1,845,050. Granted February 16, 1932, to

HENRI LANTZ ET AL.

It is hereby certified that error appears in the printed specification of the above numbered patent requiring correction as follows: Page 2, line 26, for "1,605,667" read 1,605,647; and that the said Letters Patent should be read with this correction therein that the same may conform to the record of the case in the Patent Office.

Signed and sealed this 22nd day of March, A. D. 1932.

(Seal)

M. J. Moore,
Acting Commissioner of Patents.